(12) United States Patent
Yoshikawa

(10) Patent No.: US 7,986,118 B2
(45) Date of Patent: Jul. 26, 2011

(54) OPEN-LOOP TORQUE CONTROL ON JOINT POSITION-CONTROLLED ROBOTS

(75) Inventor: Taizo Yoshikawa, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 609 days.

(21) Appl. No.: 12/099,047

(22) Filed: Apr. 7, 2008

(65) Prior Publication Data

US 2008/0258670 A1 Oct. 23, 2008

Related U.S. Application Data

(60) Provisional application No. 60/913,428, filed on Apr. 23, 2007.

(51) Int. Cl.
G05B 19/408 (2006.01)
(52) U.S. Cl. .............. 318/568.22; 318/568.11; 318/432; 901/8; 901/23; 700/37; 700/38; 700/39; 700/44; 700/45
(58) Field of Classification Search ............. 318/568.11, 318/568.22, 432; 901/8, 23; 700/37–39, 700/44, 45
See application file for complete search history.

(56) References Cited

U.S. PATENT DOCUMENTS

| | | | | |
|---|---|---|---|---|
| 4,864,204 | A * | 9/1989 | Daggett et al. ............. | 318/568.2 |
| 4,925,312 | A * | 5/1990 | Onaga et al. ................. | 700/261 |
| 5,986,422 | A | 11/1999 | Iwashita et al. | |
| 6,961,628 | B2 * | 11/2005 | Yutkowitz ...................... | 700/37 |
| 7,211,979 | B2 | 5/2007 | Khatib et | |
| 2006/0186845 | A1 * | 8/2006 | Terada et al. ................ | 318/432 |
| 2007/0070738 | A1 | 3/2007 | Gonzalez-Banos et al. | |

OTHER PUBLICATIONS

Aghili, F., "Joint torque sensory in robotics," Industrial Robotics: Programming, Similuation and Applications, Dec. 2006, p. 23-46.
Hirukawa, H., et al., "The Human-Size Humanoid Robot That Can Walk, Lie Down and Get Up," international Journal of Robotics Research, 2005, p. 755-769, vol. 24, No. 9.
Ohmura, Y., et al., "Humanoid Robot which can Lift a 30kg Box by Whole Body Contact and Tactile Feedback," International Conference on Intelligent Robots and Systems, 2007, p. 1136-1141.
Park, J., et al., "Contact Consistent Control Framework for Humanoid Robots," International Conference on Robotics and Automation, May 15-19, 2006.
Tokhi et al., "SCEFMAS: An Environment for Dynamic Characterisation and Control of Flexible Robot Manipulators," International Journal of Engineering Education, 1999, p. 213-226, vol. 15 No. 3.
Tsumugiwa, T., et al., "Switching control of position/torque control for human-robot cooperative task—human-robot cooperative carrying and peg-in-hole task," Robotics and Automation, 2003. Proceedings. ICRA '03. IEEE International Conference on Sep. 14-19, 2003, Nov. 10, 2003, p. 1933-1939, vol. 2.
PCT International Search Report and Written Opinion, PCT/US2008/061014, Aug. 4, 2008.

* cited by examiner

*Primary Examiner* — Walter Benson
*Assistant Examiner* — Erick Glass
(74) *Attorney, Agent, or Firm* — Fenwick & West LLP; Mark Duell

(57) ABSTRACT

A joint of a robot is controlled by a torque command. The joint has a position controller with a position feedback loop. The torque command is received for the joint, and a velocity feedforward command is determined for realizing the torque command using the position controller. The velocity feedforward command is sent to the position controller and the position feedback loop is canceled. The position feedback loop is canceled by sending a position command to the position controller, where the position command is an actual measured position of the joint. The position feedback loop is also canceled by setting the gain of the position feedback loop to zero.

20 Claims, 16 Drawing Sheets

OPEN-LOOP TORQUE CONTROL ON JOINT POSITION-CONTROLLED ROBOTS

CROSS-REFERENCE TO RELATED APPLICATION

This application claims priority from the following U.S. provisional patent application, which is hereby incorporated by reference: Ser. No. 60/913,428, filed on Apr. 23, 2007, entitled "A New Approach for Open-Loop Torque Control on Traditional Joint Position-Controlled Robots."

BACKGROUND OF THE INVENTION

1. Field of the Invention

The present invention relates to torque control of a robot.

2. Description of Background Art

Often, a robot is commanded to follow a given trajectory in order to accomplish a particular task. Individual joint position commands are calculated by applying inverse kinematics for an end-effector's position level control in Cartesian space. Motion can also be accomplished by directly commanding individual joint positions. A typical position controller by Proportional-Integral-Derivative (PID) control is implemented for each joint level controller and the joint position command is achieved by high gain control. This is a popular control system used with industrial robots. It is used because accuracy and quick responses are required to accomplish desired tasks and these were achieved by traditional position control.

Many humanoid robots are also controlled by position control. Traditional position controllers have been successfully applied for humanoid robot control, particularly for balancing and walking control. This is because accuracy and fast responses for Zero Moment Point (ZMP) control and manipulation are of a high priority for humanoid robots. Human-like whole-body motions and simple manipulation tasks are also often realized by using traditional position control.

More advanced robots are desired to work not only in industry but also in the everyday environment of people. These robots can be used to assist people and to communicate with people in their homes, offices, public spaces, hospitals, disaster areas etc. One of the critical problems for controlling a robot in people's daily environments is (i) contact between the robot and the external environment and (ii) contact with people. In case of the contact with the environment, unpredictable contact will happen because the work space of the robot is very narrow and complicated. In case of the contact with people, human motion itself is unpredictable. However, many advanced robots are not designed for contact. They are designed for the presumption that the external environment is fixed or that contact points are limited (e.g., both hands and feet). As a result, development of compliant motion for safe contact with the environment and with people is an important issue for advanced robot control.

Whole-body contact and control are often used for many small robots. Because a small robot has a lower weight, the contact force between the robot and the external environment is negligible. Also, in many cases, small robots are controlled by position command which is generated by kinematics without accounting for any contact force. As for human-sized robots, whole-body motion has been used with some robots. These robots can stand up from a prone position or crawl in a narrow space. However, the motion is pre-designed and the robot is just following the motion commanded by position control. Compliant control is applied to motion in contact; however, the motion while in contact with the environment is limited to a fixed or stable environment. To realize more advanced whole-body motion in contact with the environment or with a human, the robot's posture should be compliant with external forces so that the robot can accomplish its multiple tasks smoothly by sensing the environment through physical contact as a human would.

One solution for this problem is use torque control for robots. Often, to realize torque control, the control system hardware is designed for torque control. The motor is controlled by a torque control unit by which measured torque feedback data is compensated and a desired torque command input is achieved. However, a torque controlled system uses significantly different hardware from a position controlled system, which is commonly found in robots. As a result, it can be difficult to use torque control with a position controlled system. What is needed is a method for realizing compliant open-loop torque control on a traditional position-controlled system with position-control hardware.

SUMMARY OF THE INVENTION

The above need is met by a method for controlling a joint of a robot, the joint having a position controller with a position feedback loop. A torque command is received for the joint, and a velocity feedforward command is determined for realizing the torque command using the position controller. The velocity feedforward command is sent to the position controller and the position feedback loop is canceled. The position feedback loop is canceled by sending a position command to the position controller, where the position command is an actual measured position of the joint. The position feedback loop is also canceled by setting the gain of the position feedback loop to zero.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
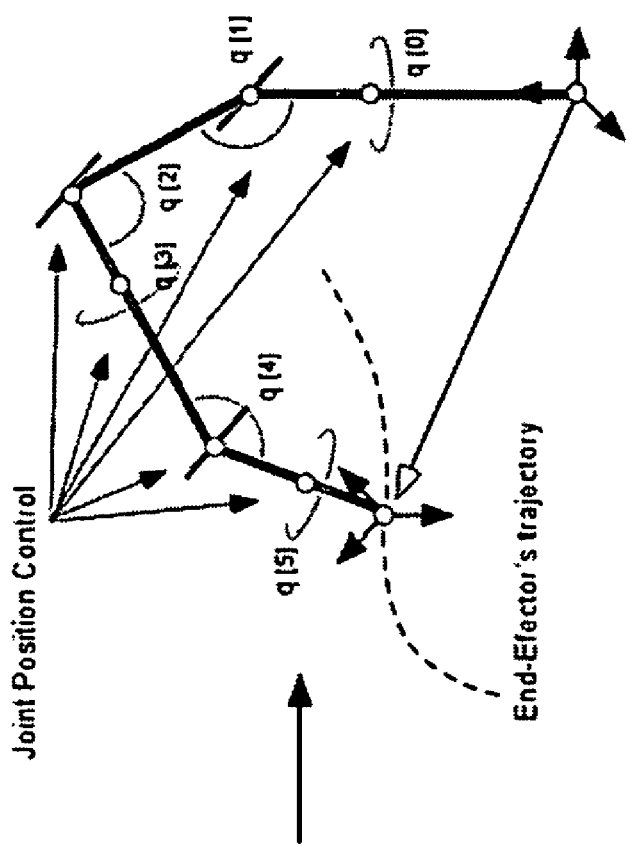
FIG. 1 illustrates the motion control of a robot with a position control system, in one embodiment.
Figure 1:
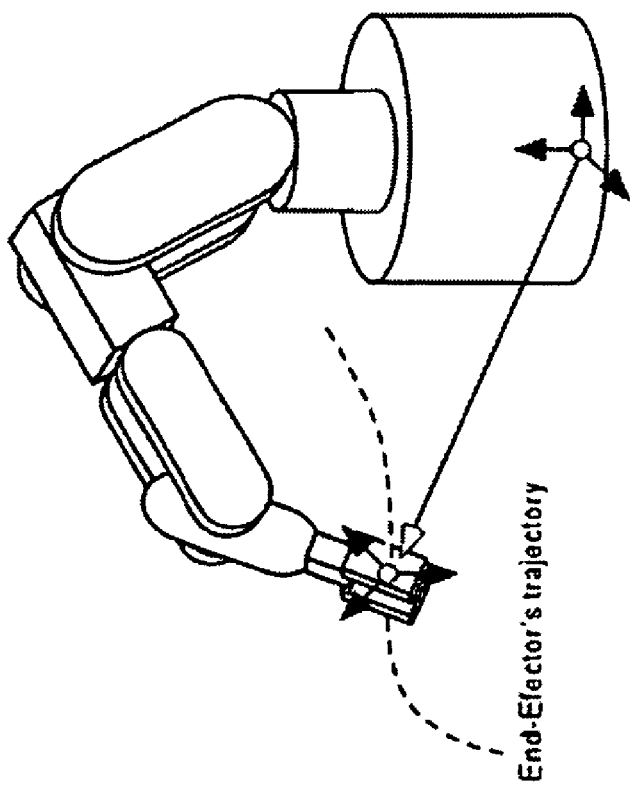

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1 illustrates the motion control of a robot with a position control system, in one embodiment. The desired end-effector trajectory is shown as the dotted line, where the trajectory is the position of the end-effector over time. This trajectory may be desired in order to achieve some specific task. Individual joint position and velocity commands can be calculated based on the desired trajectory by applying inverse kinematics. The individual joint positions can also be commanded directly.

Figure 2:
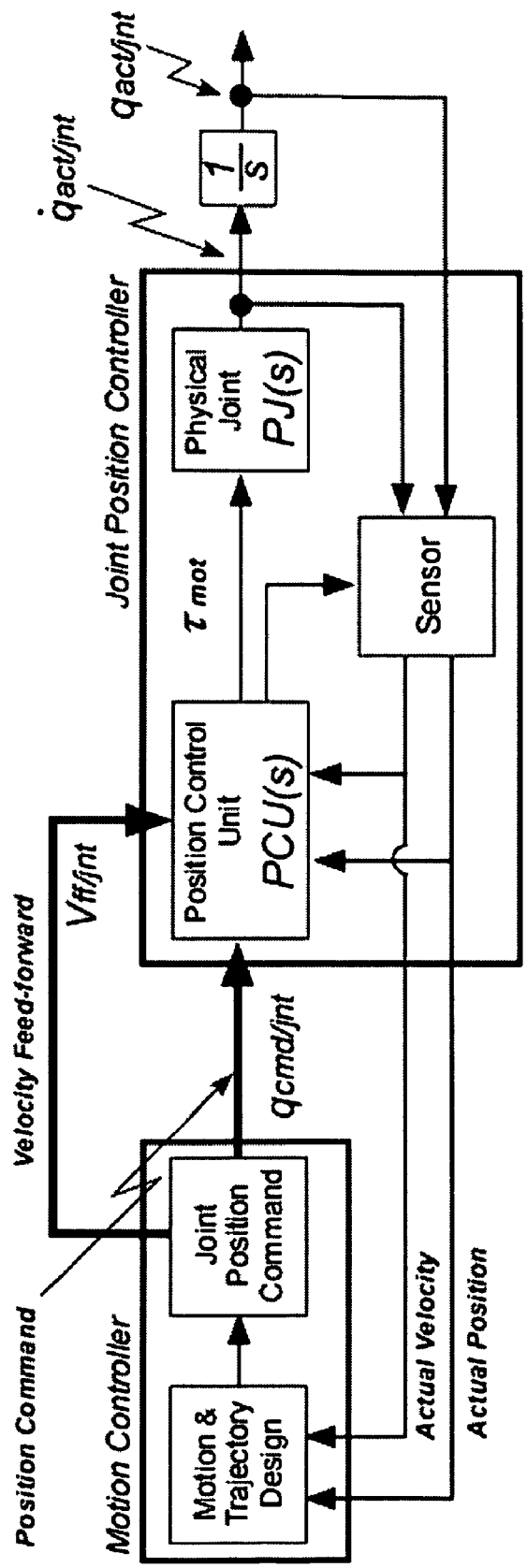
FIG. 2 is a block diagram illustrating a position control system, in one embodiment.

FIG. 2 is a block diagram illustrating a position control system, in one embodiment. The position control system does not have a torque feedback loop. The position control system includes a motion controller and a joint position controller for each joint. The motion controller calculates a position command and a velocity command for each joint based on the task and desired trajectory and sends these commands to the joint position controller. The motion controller also receives the actual joint positions and velocities as inputs. The joint position controller includes a joint position control unit with transfer function PCU(s), a physical joint with transfer function PJ(s), and a sensor. The joint position control unit is also referred to as a position control unit.

The inputs to the joint position control unit are a position command $q_{cmd/jnt}$ and a velocity command $V_{ff/jnc}$ provided by the motion controller. The position control unit includes a motor that is controlled based on the position and velocity commands. The motor generates a motor torque $\tau_{mot}$. The position control unit is typically designed to compensate for the linear dynamics of the joint as well as to address any nonlinear dynamics of the joint. As illustrated in FIG. 2, a negative feedback loop is closed around the series combination of the joint position control unit, PCU(s), and the physical joint, PJ(s), to drive the position error to zero.

A position controller by proportional-integral-derivative (PID) control is implemented for each position control unit. The position control system has a position feedback loop and a velocity feedback loop in which data is measured by the sensor. Actual position is measured by an encoder sensor or a potentiometer, etc., which is attached to the motor. Actual velocity is measured by a velocity sensor or calculated by actual position data. Generally, the motor is connected to a gear to generate a large torque at the physical joint. To improve accuracy and quick responses of the motor control, a velocity feedforward command is applied to the position control unit and the position gain and velocity gain are adjusted for every joint motor.

The dynamics of the physical joint with transfer function PJ(s) is given by $$I_{phy}\ddot{q} + F_{phy}\dot{q} + N(q,\dot{q}) = \tau_{mot} \quad (1)$$

Here, $I_{phy}$ is the physical moment of inertia, $F_{phy}$ is the physical linear friction coefficient at the joint output and $N(q, \dot{q})$ is the nonlinear element in the joint dynamics. These values are calculated by using the mechanical properties of the system. q, $\dot{q}$, and $\ddot{q}$ are the position, velocity, and acceleration of the joint, respectively. $\tau_{mot}$ is the torque produced by the motor as described above.

Figure 3:
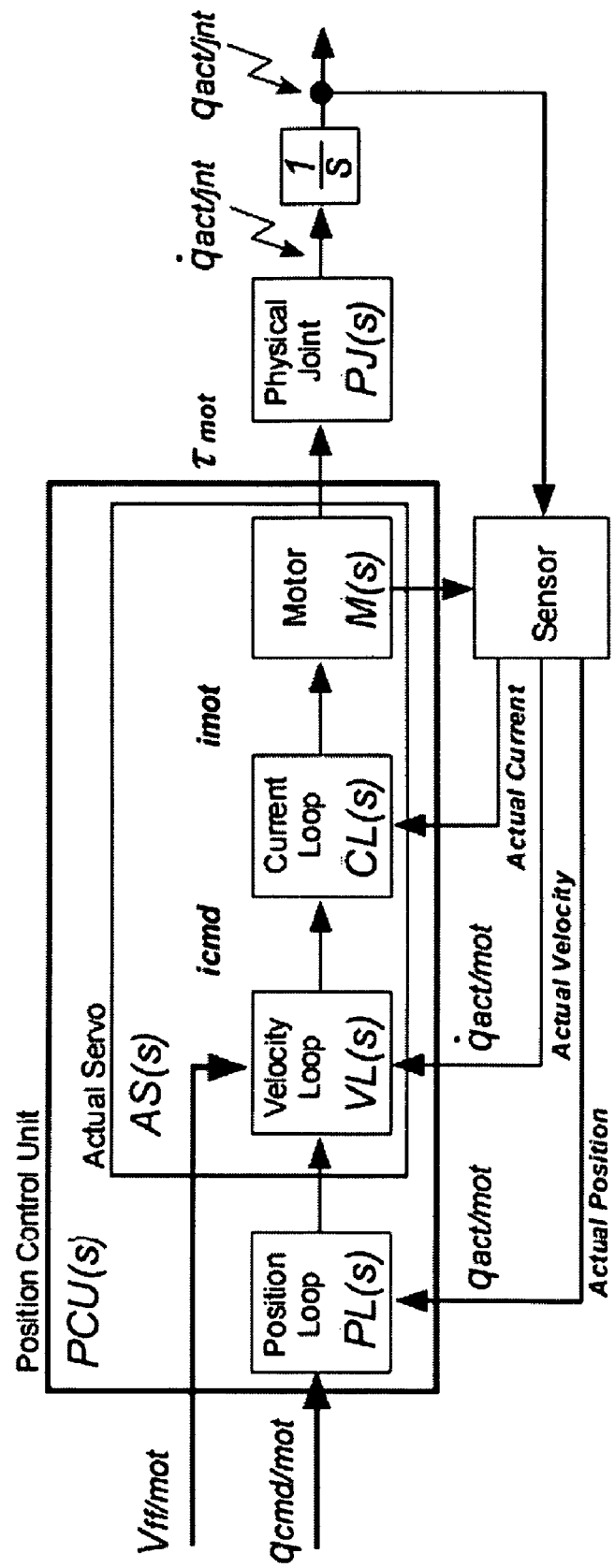
FIG. 3 is a block diagram illustrating the joint position controller, also referred to as the motor controller, from FIG. 2, in one embodiment.

FIG. 3 is a block diagram illustrating the joint position controller, also referred to as the motor controller, from FIG. 2, in one embodiment. The inputs to the motor controller are a position command $q_{cmd/mot}$ and a velocity command $V_{ff/mot}$ which are provided by the higher level motion controller. The motor controller includes a position feedback loop with transfer function PL(s), a velocity feedback loop with transfer function VL(s), and a current feedback loop with transfer function CL(s).

Figure 4:
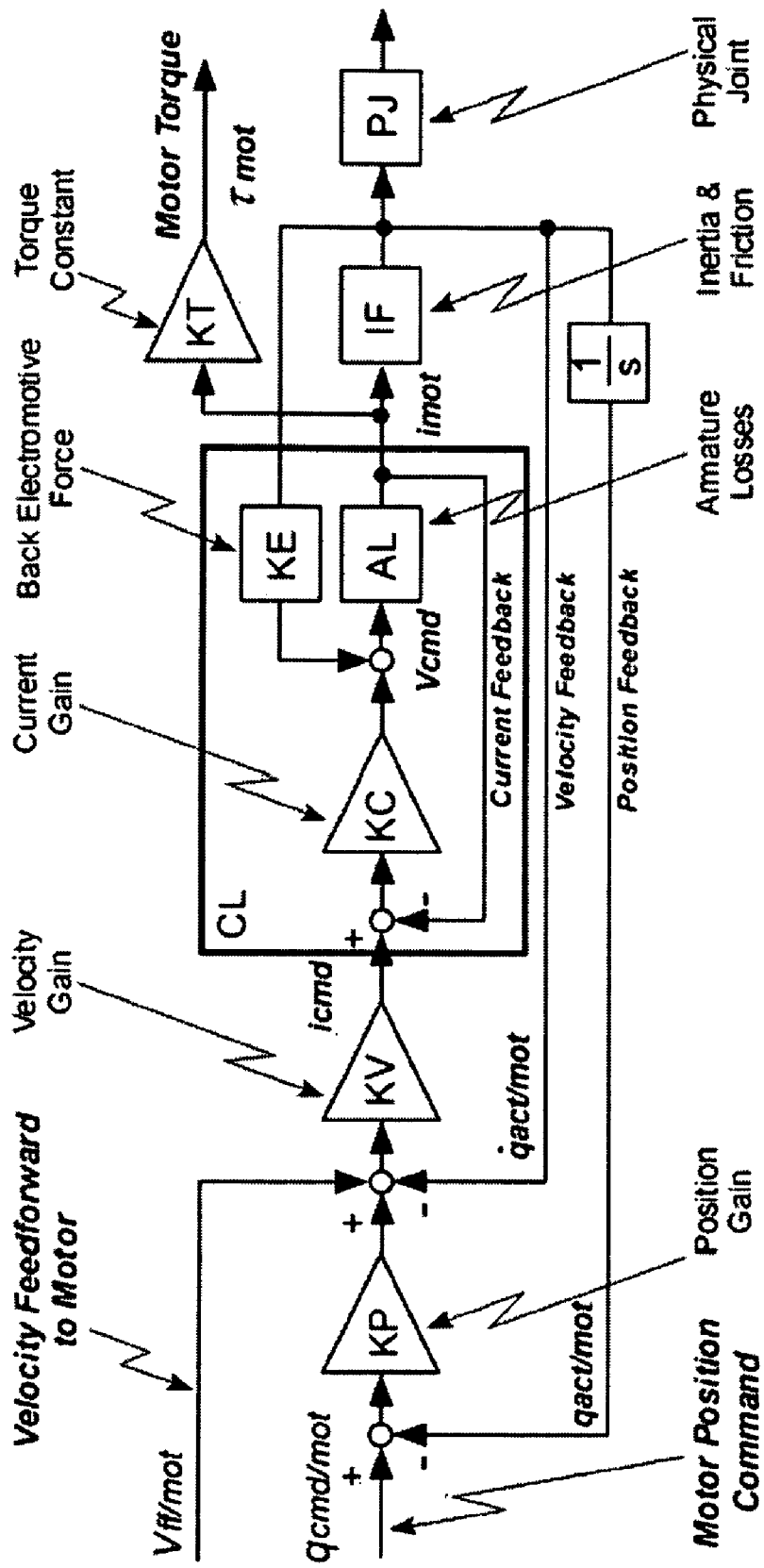
FIG. 4 is a motor-level block diagram illustrating the motor controller from FIG. 2 showing feedback gains, in one embodiment.

FIG. 4 is a motor-level block diagram illustrating the motor controller from FIG. 2 showing feedback gains, in one embodiment. In the position feedback loop, the actual position, $q_{act/mot}$, is subtracted from the position command $q_{cmd/mot}$ and the result is multiplied by the position gain KP. After the position feedback loop, a velocity feedforward command is applied to improve the response quickness of the position control. In the velocity feedback loop, the negative feedback loop is closed by subtracting the actual velocity, $\dot{q}_{act/mot}$ and the result is multiplied by the velocity gain, KV to generate a current command $i_{cmd}$.

In the current feedback loop, CL, the current gain KC is composed of a current proportional gain $K_{ip}$ and a current integral gain $K_{ii}$. The negative current feedback loop is closed by subtracting the actual current, $i_{mot}$ from $i_{cmd}$. AL represents armature losses and is defined as $1/(L_m s + R_m)$ where $R_m$ is the motor resistance and $L_m$ is the motor inductance. KE is the back electromotive force which is generated by the actuation of the motor torque. The motor torque is calculated by multiplying torque constant KT with actual current $i_{mot}$ that is output from the current feedback loop. IF is composed of rotor inertia $J_m$ and rotor friction $B_m$ and is defined as $1/(J_m s + B_m)$. The motor is controlled by this framework and the physical joint PJ is actuated according to the commands with high gain feedback control.

Figure 5:
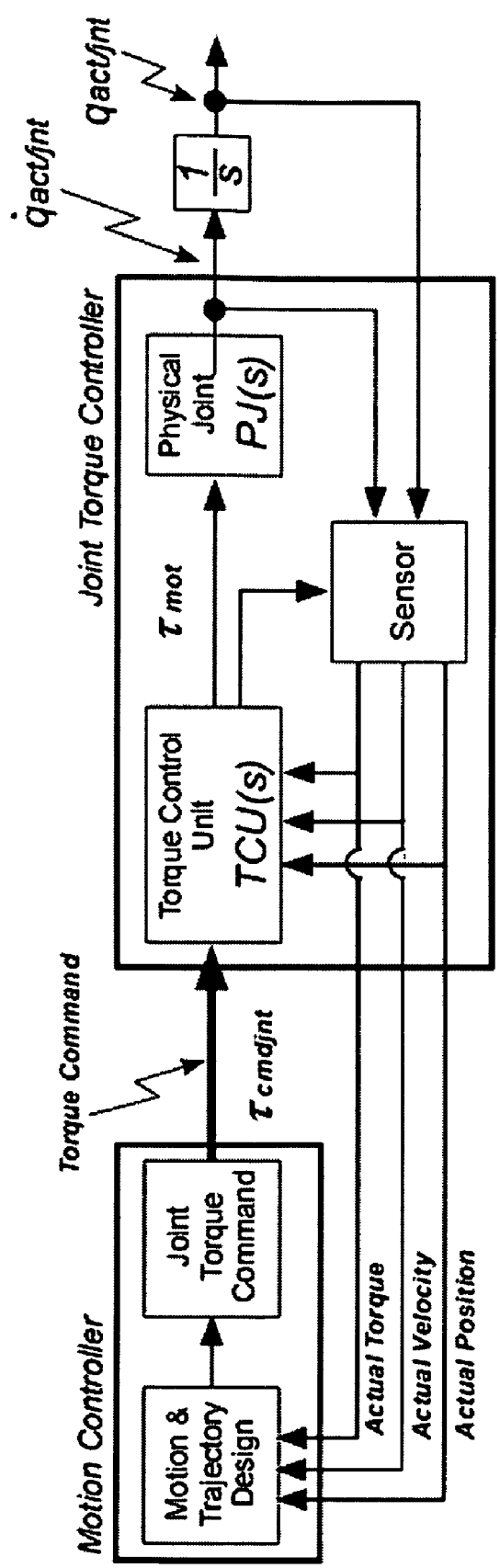
FIG. 5 is a block diagram illustrating a torque-controlled system, in one embodiment.

FIG. 5 is a block diagram illustrating a torque-controlled system, in one embodiment. The system includes a motion controller and a joint torque controller, also referred to as a motor torque controller. As in a position-controlled system, the robot is designed to undergo a particular motion that follows a desired trajectory in order to complete a task. The motion controller calculates the individual joint torque command $\tau_{cmd/jnt}$ which is sent to the joint torque controller. The motion is designed based on the end-effector position. The torque command is calculated per clock tick based on the desired motion. The calculation requires identifying link parameters such as mass, inertia, and center of gravity. Gravity torque is computed to compensate for gravity.

The motor torque controller is composed of a torque control unit, also referred to as a motor torque control unit, a sensor, and a physical joint which has a gear system. The torque control unit includes a motor. Unlike the joint position-controlled system of FIG. 2, the joint torque-controlled system has an accurate torque or current feedback loop in motor torque control unit by which motor is directly actuated based on the torque command from the motion controller. A torque-controlled system usually requires the torque control unit which is not present in the position-controlled system. Therefore, hardware modification is required to move from position-controlled system to torque-controlled system. Moreover, a consistent framework for dynamical calculation is required to compensate some dynamical effects such as gravity torque, coupling etc. Consequently, it can be difficult to implement torque control for a robot.

Figure 6:
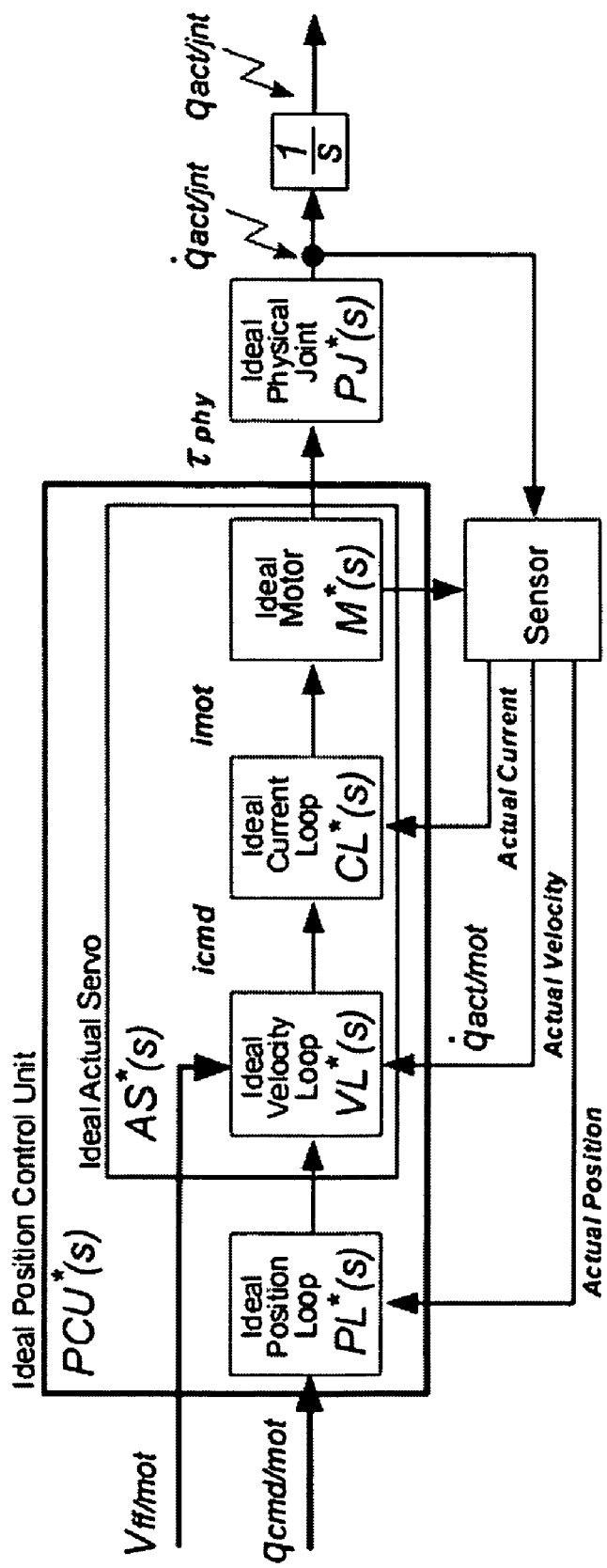
FIG. 6 is a block diagram illustrating a joint position controller with an ideal position control unit, in one embodiment.

FIG. 6 is a block diagram illustrating a joint position controller with an ideal position control unit, in one embodiment. In FIG. 6, the joint position controller of FIG. 3 is modified with an ideal position control unit with transfer function PCU*(s), the resulting ideal physical joint with transfer function PJ*(s), and the ideal torque $\tau_{phy}$. The ideal position control unit (PCU*(s)) includes an ideal actual servo with transfer function AS*(s). The effect of a position loop with transfer function PL*(s) is canceled by using the actual position as the position command or by setting the position feedback loop gain to be KP=0. Consequently, the input to the motor becomes only a velocity feedforward command $V_{ff/mot}$. A closed loop transfer function T(s) between the command $V_{ff/mot}$ and resulting position $\dot{q}_{act/mot}$ is represented as follows.

$$T(s) = \dot{q}_{act/mot}(s)/V_{ff/mot}(s) \quad (2)$$

The torque at the joint $\tau_{phy}$ is given by $$\tau_{phy}(s) = AS^*(s) \cdot (V_{ff/mot}(s) - \dot{q}_{act/mot}(s)) = AS^*(s) \cdot V_{ff/mot}(s)(1-T(s)) \quad (3)$$

In cases where nonlinear effects at the joint are negligible, the terms AS*(s) and PJ*(s) can be represented as linear transfer functions. They can be analytically defined by a block diagram using the dynamics parameters of the motor. In this case, the ideal torque $\tau_{phy}(s)$ is calculated as $\tau_{cmd}(s)$, the desired torque.

In cases where nonlinear effects at the joint are not negligible, T(s) cannot be computed analytically; however, T(s) can be experimentally identified from frequency analysis of the feedback control system response. Given the identified closed loop transfer function T(s) and PJ*(s), the ideal controller can be computed as follows:

$$AS^*(s) = \frac{T(s)}{PJ^*(s) - T(s) \cdot PJ^*(s)} \quad (4)$$

Here, the ideal torque $\tau_{phy}(s)$ is derived as the torque associated with the linear part of the ideal dynamic system. Therefore, the ideal physical joint, PJ*(s), is defined as follows:

$$PJ^*(s) = \frac{1}{I_{phy}s^2 + F_{phy}s} \quad (5)$$

where $F_{phy}$ is the friction of the joint and $I_{phy}$ is the inertia of the inertia of the gear and link attached to the joint.

The ideal physical torque $\tau_{phy}(s)$ at the joint is the desired dynamic torque $\tau_{des}$ if the ideal position control unit with transfer function $AS^*(s)$ is identified. The velocity input $V_{ff/mot}(s)$ corresponding to a desired dynamic torque $\tau_{des}(s)$ is determined from Equation 3 as follows:

$$V_{ff/mot}(s) = \frac{\tau_{des/mot}(s)}{AS^*(s)} + \dot{q}_{act/mot}(s) = \frac{\tau_{des}(s)}{AS^*(s) \cdot (1 - T(s))} \quad (6)$$

Here, $AS^*(s)$ is the identified position control unit transfer function defined by $AS^*(s) = VL^*(s) \cdot CL^*(s) \cdot M^*(s)$.

Equation 6 shows how the dynamic velocity input $V_{ff/mot}(s)$ relates to desired torque command $\tau_{des}(s)$ for a position controlled system. At the joint level, Equation 6 becomes:

$$V_{ff/jnt}(s) = \frac{\tau_{cmd/jnt}(s)}{AS(s) \cdot \eta^2} + \dot{q}_{act/jnt}(s) = \frac{\tau_{cmd/jnt}(s)}{AS(s) \cdot \eta^2 \cdot (1 - T(s))} \quad (7)$$

where $\eta$ is the gear ratio and where:

$$V_{ff/mot}(s) = \eta \cdot V_{ff/mot}(s)$$

$$\dot{q}_{act/mot}(s) = \eta \cdot \dot{q}_{act/jnt}(s)$$

$$\tau_{cmd/jnt}(s) = \eta \cdot \tau_{cmd/mot}(s) \quad (8)$$

Equation 6 and 7 show how the dynamic velocity input $V_{ff/mot}(s)$ relates to the desired torque command $\tau_{cmd}(s)$ for a position controlled system as illustrated in FIG. 6. In one embodiment, the relationship between the position input and torque command is as follows:

$$V_{ff/mot}(s) = \frac{\tau_{cmd/mot}(s)}{AS(s)} + \dot{q}_{act/mot}(s) \quad (9)$$

$$q_{cmd/mot} = q_{act/mot} \text{ or } K_p = 0$$

$$V_{ff/mot}(s) = \eta \cdot V_{ff/jnt}(s)$$

$$\dot{q}_{act/mot}(s) = \eta \cdot \dot{q}_{act/jnt}(s)$$

$$\tau_{cmd/jnt}(s) = \eta \cdot \tau_{cmd/mot}(s)$$

Figure 7:
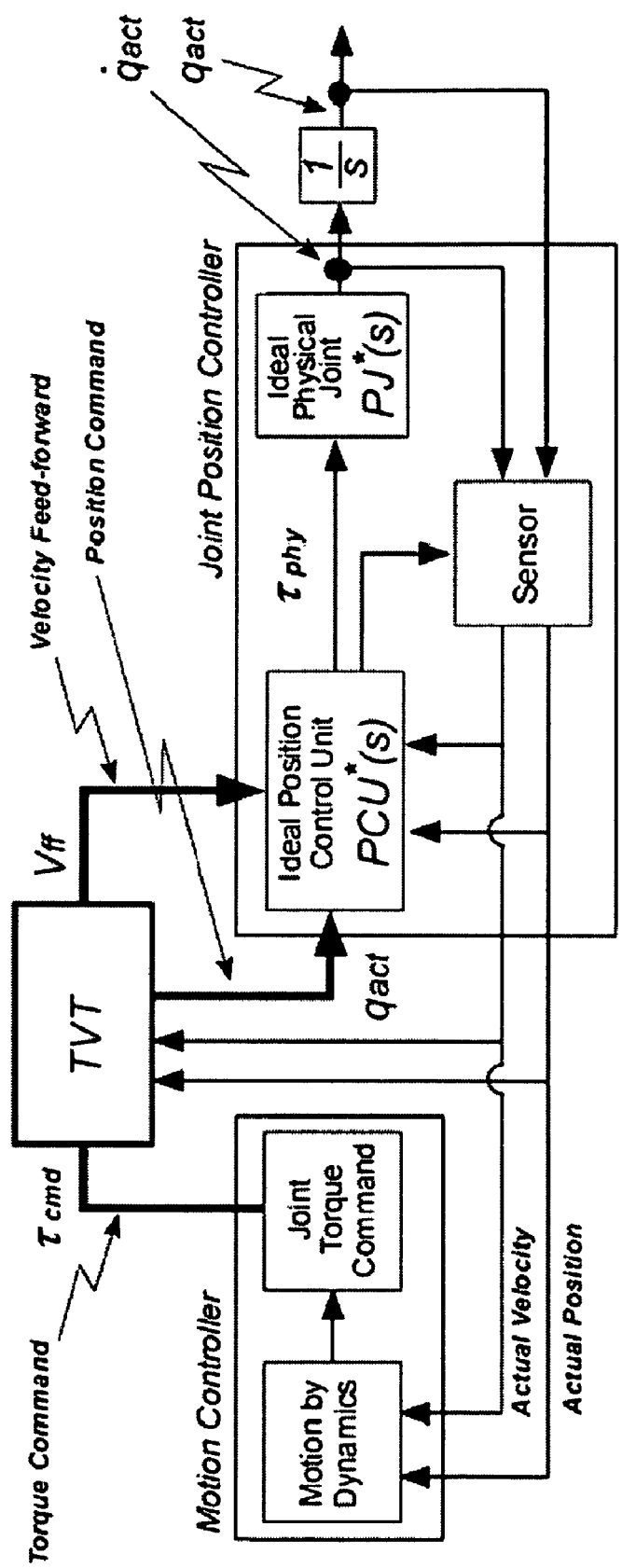
FIG. 7 is a block diagram illustrating torque controlled system with a position controller using a torque to velocity transformer (TVT), in one embodiment.

FIG. 7 is a block diagram illustrating torque controlled system with a position controller using a torque to velocity transformer (TVT), in one embodiment. In this system, a torque command generated by the motion controller is transformed by the TVT into a velocity feedforward command and a position command. The velocity feedforward command and position command is sent to the position controller, which may be a traditional position controller commonly used for robots. The position command generated by the TVT is the actual position to cancel the effect of the position feedback loop. It is also possible to cancel the effect of the position feedback loop by commanding KP=0.

Figure 8:
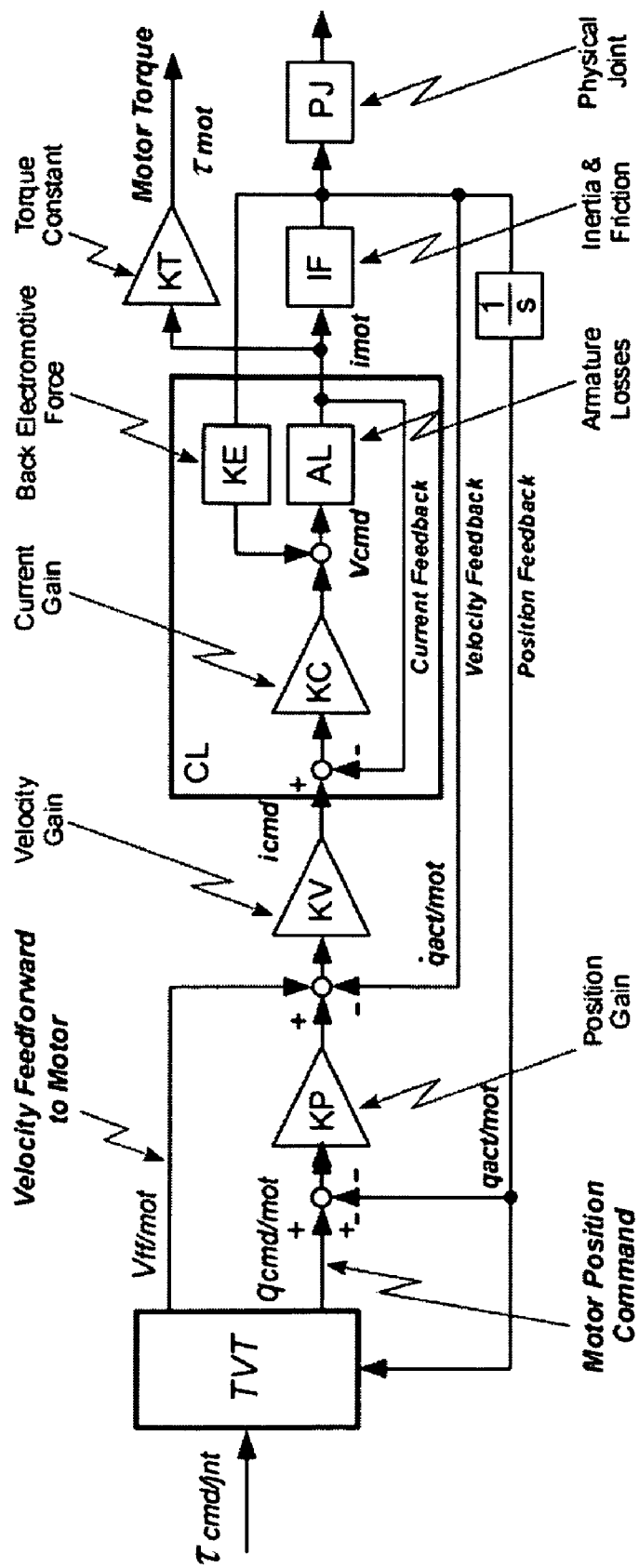
FIG. 8 is a motor-level block diagram illustrating a portion of the system from FIG. 7 showing feedback gains, in one embodiment.

FIG. 8 is a motor-level block diagram illustrating a portion of the system from FIG. 7 showing feedback gains, in one embodiment. Using the TVT, the torque command is directly sent to the motor current command $i_{cmd}$. The TVT enables the use of open-loop torque control on a traditional position controller. It advantageously makes it possible to realize open-loop torque control on the traditional position controller without modifying the hardware of the position controller. The motor controller is identified to create the TVT.

The position controller takes the following inputs: 1) Velocity feedforward input to the motor, and 2) Position command input to the motor or position feedback loop gain to the motor. In one embodiment, the TVT takes the following inputs: 1) An actual position for canceling the position feedback loop by commanding the actual position to the motor, and 2) An actual velocity for canceling the velocity feedback loop by commanding the actual velocity to the motor.

FIG. 7 shows a framework of a system with a torque control and a traditional position controller. The TVT provides functions to enable this system. It cancels the effect of the position feedback loop of the motor. The effect of the position loop with transfer function $PL^*(s)$ in FIG. 6, is canceled by commanding the position controller with the actual position or by setting the position feedback loop gain so that KP=0 (see FIG. 4). Also, the TVT transforms the torque command into a velocity feedforward command to the motor.

It is useful to identify $AS^*(s)$, which is shown in FIG. 6 and defined in Equation 6. The effect of a position loop with transfer function $PL^*(s)$ is cancelled by commanding position with the actual position or by commanding the position feedback loop gain as KP=0. To derive $AS^*(s)$, only the velocity command, $V_{ff/mot}$, needs to be considered. The system can be analytically defined by a block diagram and by the dynamic parameters of the motor. In the system, the joint position command $q_{cmd/mot}$ is commanded by actual joint position $q_{act/mot}$ to cancel the effect of the position feedback loop:

$$KP \cdot (q_{cmd/mot} - q_{act/mot}) = 0 \quad (10)$$

By multiplying velocity gain KP and KV, the input $i_{cmd}$ to the current feedback loop, becomes:

$$i_{cmd} = KV \cdot (V_{ff/mot} - \dot{q}_{act/mot}) \quad (11)$$

On the other hand, the motor generates the torque through its actuation. The motor torque is determined as follows:

$$\tau_{phy} = KT \cdot i_{mot} = KT \cdot CL \cdot i_{cmd} \quad (12)$$

By applying Equation 11 to Equation 12, $\tau_{phy}$ is determined as follows:

$$\tau_{phy} = KV \cdot KT \cdot CL \cdot (V_{ff} - \dot{q}_{act/mot}) \quad (13)$$

By replacing $\tau_{phy}$ by $\tau_{cmd}$, $V_{ff/mot}$ is defined as follows:

$$V_{ff/mot} = \frac{\tau_{cmd/mot}}{KV \cdot KT \cdot CL} + \dot{q}_{act/mot} \quad (14)$$

At the joint level, Equation 15 is calculated using Equation 6 and Equation 14.

$$V_{ff/jnt} = \frac{\tau_{cmd/jnt}}{KV \cdot KT \cdot CL \cdot \eta^2} + \dot{q}_{act/jnt} \quad (15)$$

Figure 9:
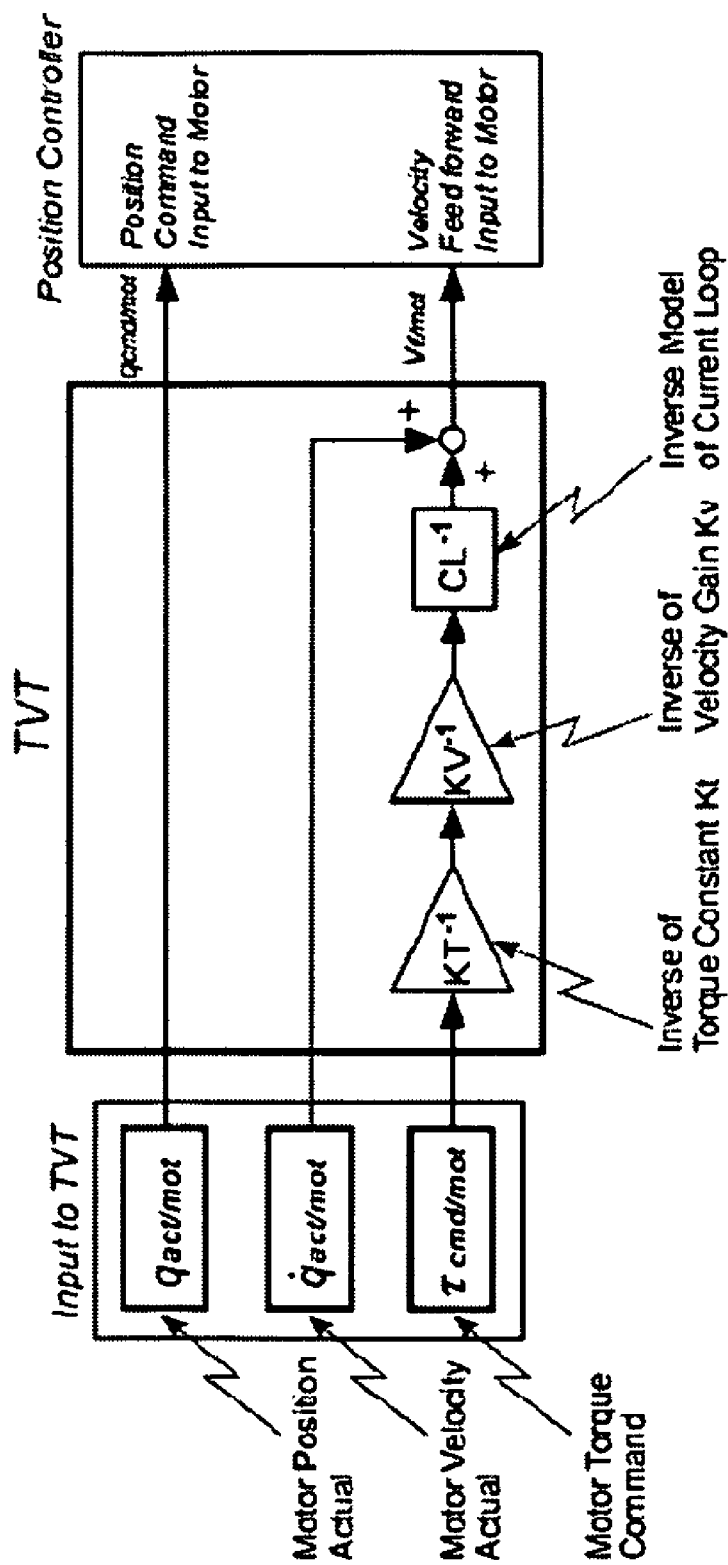
FIG. 9 is a block diagram illustrating the TVT, in one embodiment.

FIG. 9 is a block diagram illustrating the TVT, in one embodiment. The TVT includes an inverse of torque constant $KT^{-1}$, an inverse of velocity gain $KV^{-1}$ and an inverse model of the current loop $CL^{-1}$. To convert the joint level command into the motor level command, Equation 8 is applied.

Equation 15 can be simplified by assuming the transfer function of the current feedback loop CL to be equal to 1 because the response of the closed loop is much faster than the position feedback loop. In FIG. 6, the current command to the motor $i_{cmd}$ is assumed to be equal to the motor current $i_{mot}$ to simplify the model because the effect of the current feedback loop is negligible up to some servo frequency:

$$i_{cmd} = i_{mot} \quad (16)$$

Figure 10:
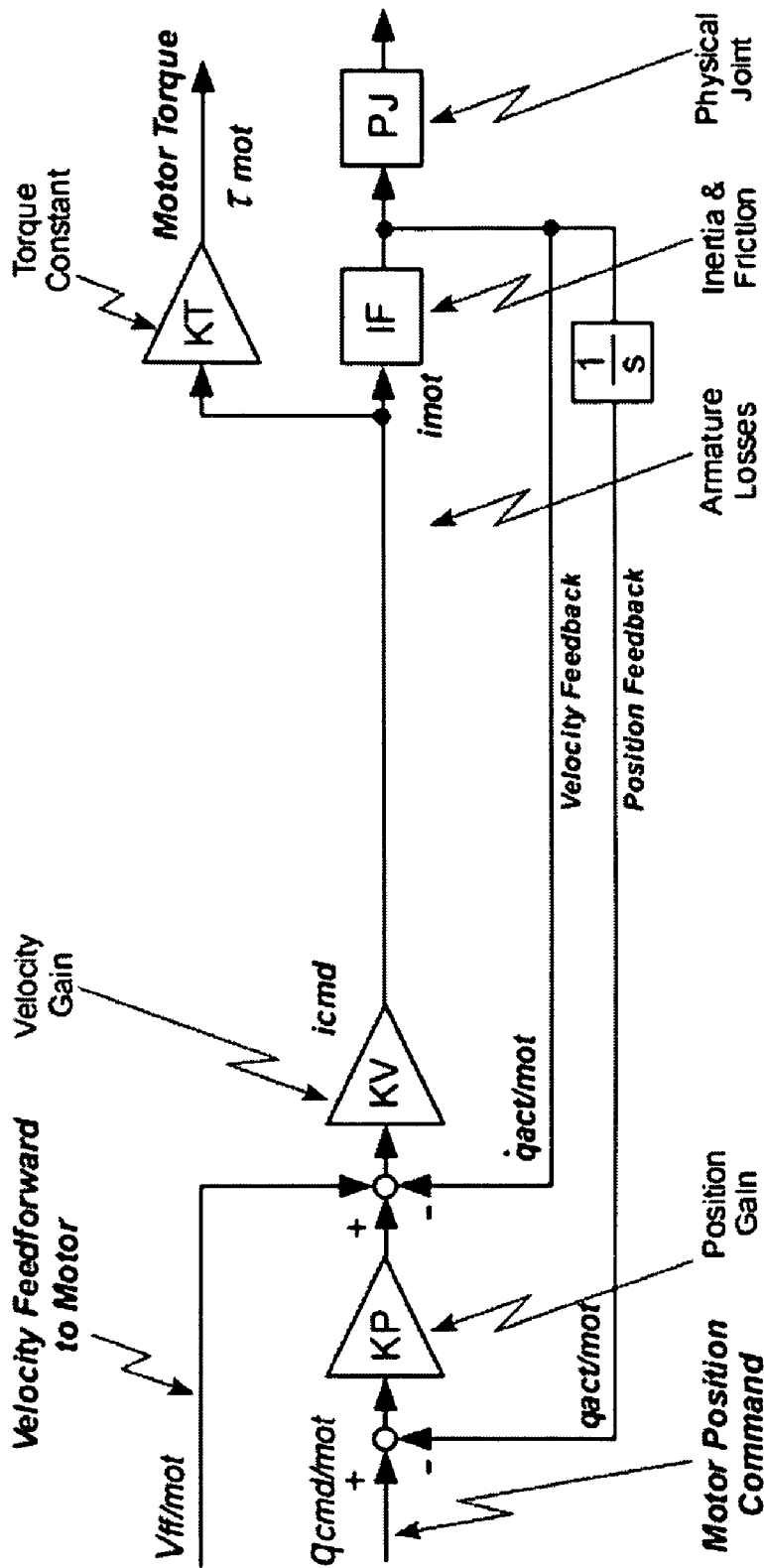
FIG. 10 is a motor-level block diagram of the motor controller from FIG. 4 with the current command assumed to be equal to the motor current, in one embodiment.

FIG. 10 is a motor-level block diagram of the motor controller from FIG. 4 with the current command assumed to be equal to the motor current, in one embodiment. The effect of the position loop PL*(s) is canceled by setting the position command to be the actual position or by commanding KP=0. To derive AS*(s), only the velocity command, $V_{ff/mot}$, needs to be considered. In this framework, the system can be analytically defined by a block diagram and the dynamic parameters of the motor. The joint position command $q_{cmd/mot}$ can be commanded by actual joint velocity $q_{act/mot}$ to cancel the effect of the velocity feedback loop:

$$KP \cdot (q_{cmd/mot} - q_{act/mot}) = 0 \quad (17)$$

By multiplying velocity gain KP and KV, the input to a current feedback loop, $i_{cmd}$, becomes:

$$i_{cmd} = KV \cdot (V_{ff/mot} - \dot{q}_{act/mot}) \quad (18)$$

On the other hand, the motor generates the torque through its actuation. The motor torque is defined as follows:

$$\tau_{phy} = KT \cdot i_{mot} = KT \cdot i_{cmd} \quad (19)$$

Applying Equation 18 to Equation 19 yields:

$$\tau_{phy} = KV \cdot KT \cdot (V_{ff} - \dot{q}_{act/mot}) \quad (20)$$

Replacing $\tau_{phy}$ by $\tau_{cmd}$, $q_{cmd/mot}$ gives:

$$V_{ff/mot} = \frac{\tau_{cmd/mot}}{KV \cdot KT} + \dot{q}_{act/mot} \quad (21)$$

At the joint level, Equation 22 below is calculated from Equation 8 and Equation 21.

$$V_{ff/jnt} = \frac{\tau_{cmd/jnt}}{KV \cdot KT \cdot \eta^2} + \dot{q}_{act/jnt} \quad (22)$$

Figure 11:
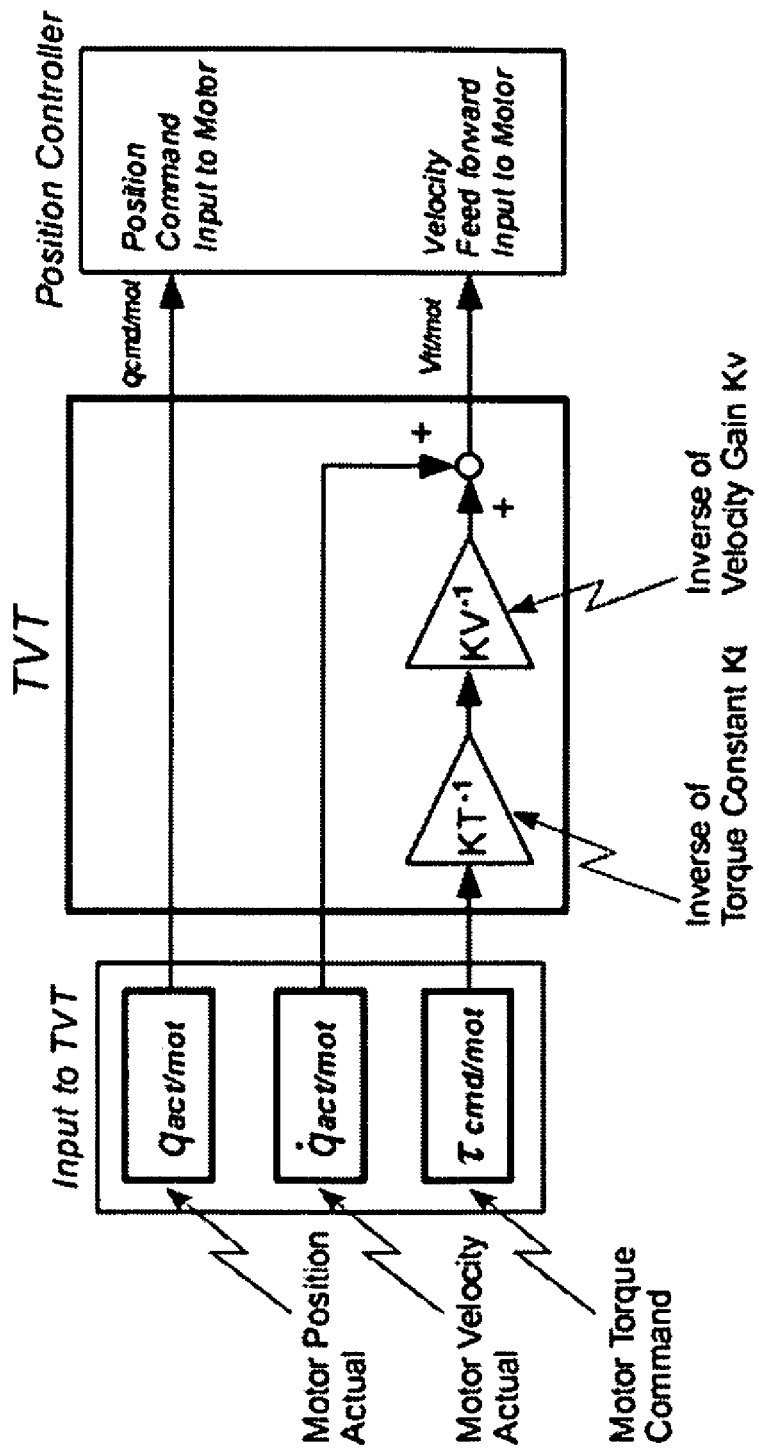
FIG. 11 is a block diagram illustrating a simplified TVT, in one embodiment.

FIG. 11 is a block diagram illustrating a simplified TVT, in one embodiment. The TVT includes an inverse torque constant $KT^{-1}$ and an inverse velocity gain $KV^{-1}$. To convert the joint level command into the motor level command, Equation 8 is applied.

Figure 12:
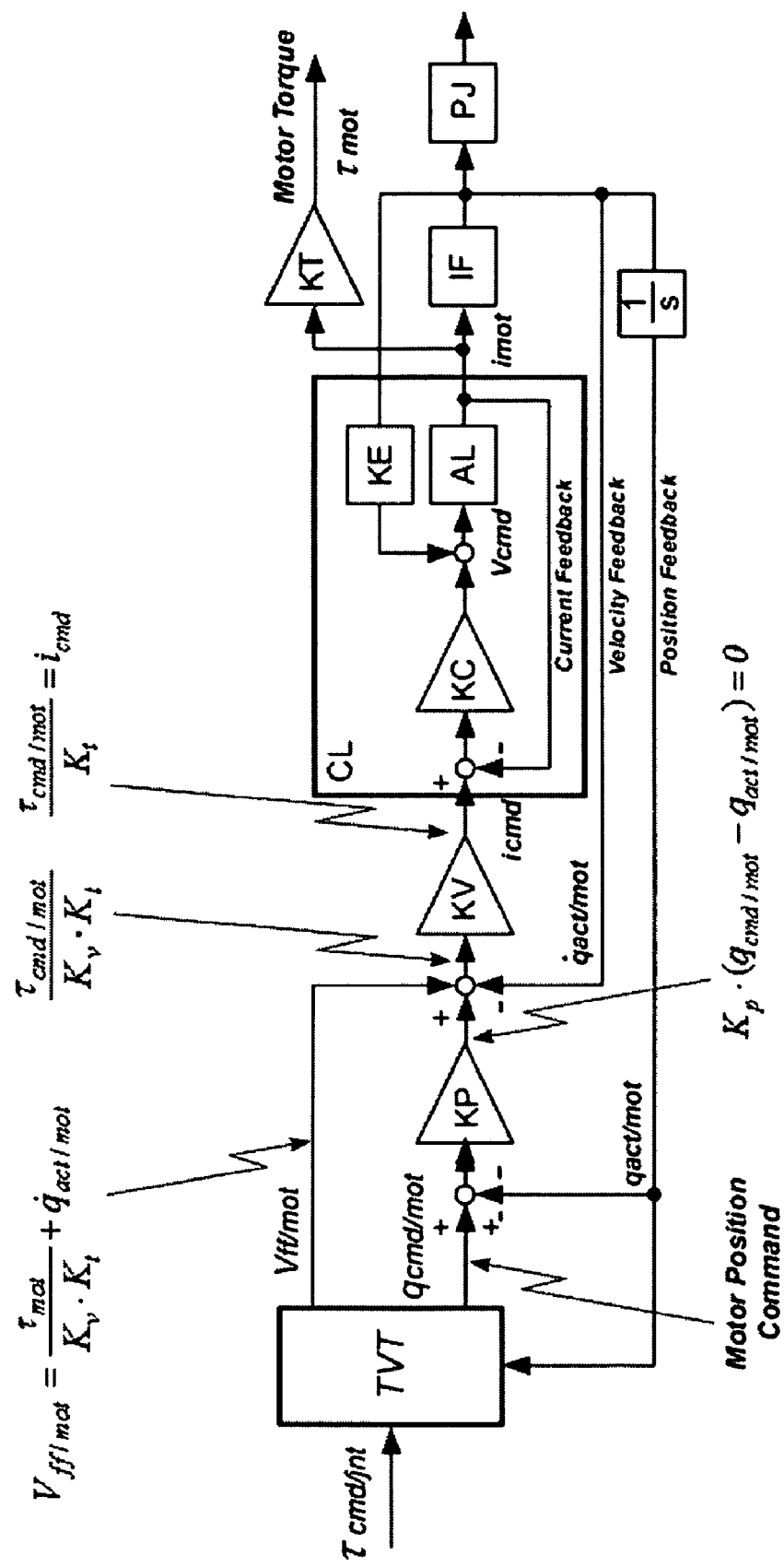
FIG. 12 is the block diagram of FIG. 8 additionally showing values at various points in the system of a TVT with a motor position controller, in one embodiment.

FIG. 12 is the block diagram of FIG. 8 additionally showing values at various points in the system of a TVT with a motor position controller, in one embodiment. The inputs to the position controller from the TVT are a position command and a velocity feedforward command. The effect of the position loop PL*(s) is canceled by commanding the position to be the actual position or by commanding KP=0. The position command is commanded by actual position and is cancelled by the feedback of actual position.

$$KP \cdot (q_{cmd/mot} - q_{act/mot}) = 0 \quad (23)$$

Therefore, the effect of a position feedback loop to a velocity feedback loop is zero. On the other hand, TVT transforms the torque command into the velocity feedforward command as follows:

$$V_{ff/mot} = \frac{\tau_{cmd/mot}}{KV \cdot KT} + \dot{q}_{act/mot} \quad (24)$$

Because the effect of the position feedback loop is cancelled, only the velocity feedforward command from Equation 24 is sent to the velocity feedback loop. The actual motor velocity is subtracted from the velocity feedforward command in the velocity feedback loop and becomes:

$$\frac{\tau_{cmd/mot}}{KV \cdot KT} \quad (25)$$

Equation 25 is multiplied by KV and is output as the current command $i_{cmd}$.

$$\frac{\tau_{cmd/mot}}{KT} = i_{cmd} \quad (26)$$

As a result, the torque command is directly sent to the current feedback loop and the current command is directly controlled from the torque command using the TVT.

Figure 13:
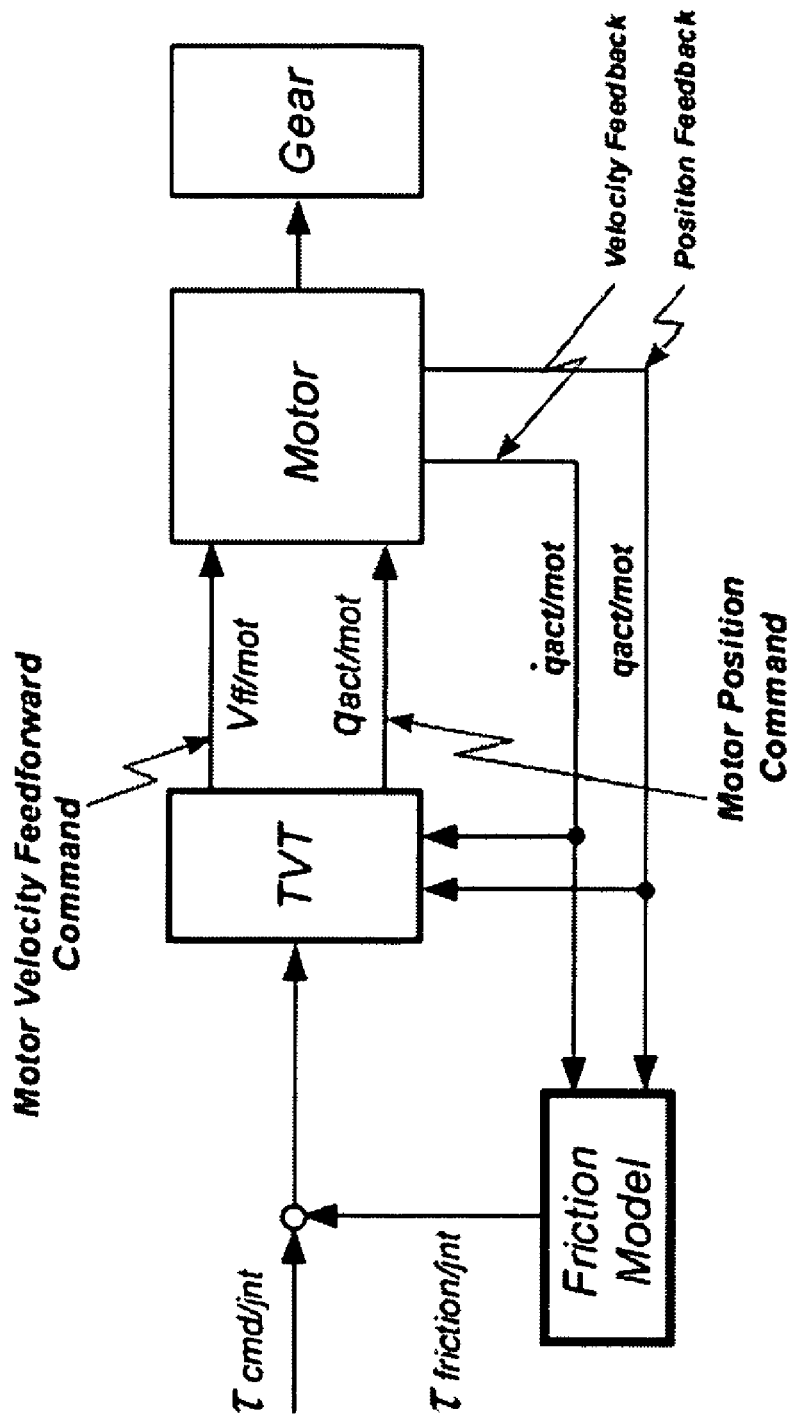
FIG. 13 is a block diagram illustrating the joint friction model, in one embodiment.

Generally, a motor is connected to a gear to generate a large torque at the physical joint; however, it also generates friction, which is not modeled in TVT discussed above. Because the TVT works as an open loop function which converts a torque command into a velocity command, the friction between a motor and a joint affects the response of TVT. The hardware dependent characteristics such as friction, stiffness, etc., can be calculated and included in the joint torque command $\tau_{cmd/jnt}$ to improve the response of the TVT in an actual robot. In one embodiment, the friction model includes: (i) a Coulomb friction model, (ii) viscous friction, and (iii) stiction, that are applied and added to the torque command to the TVT. FIG. 13 is a block diagram illustrating the joint friction model, in one embodiment.

Figure 14:
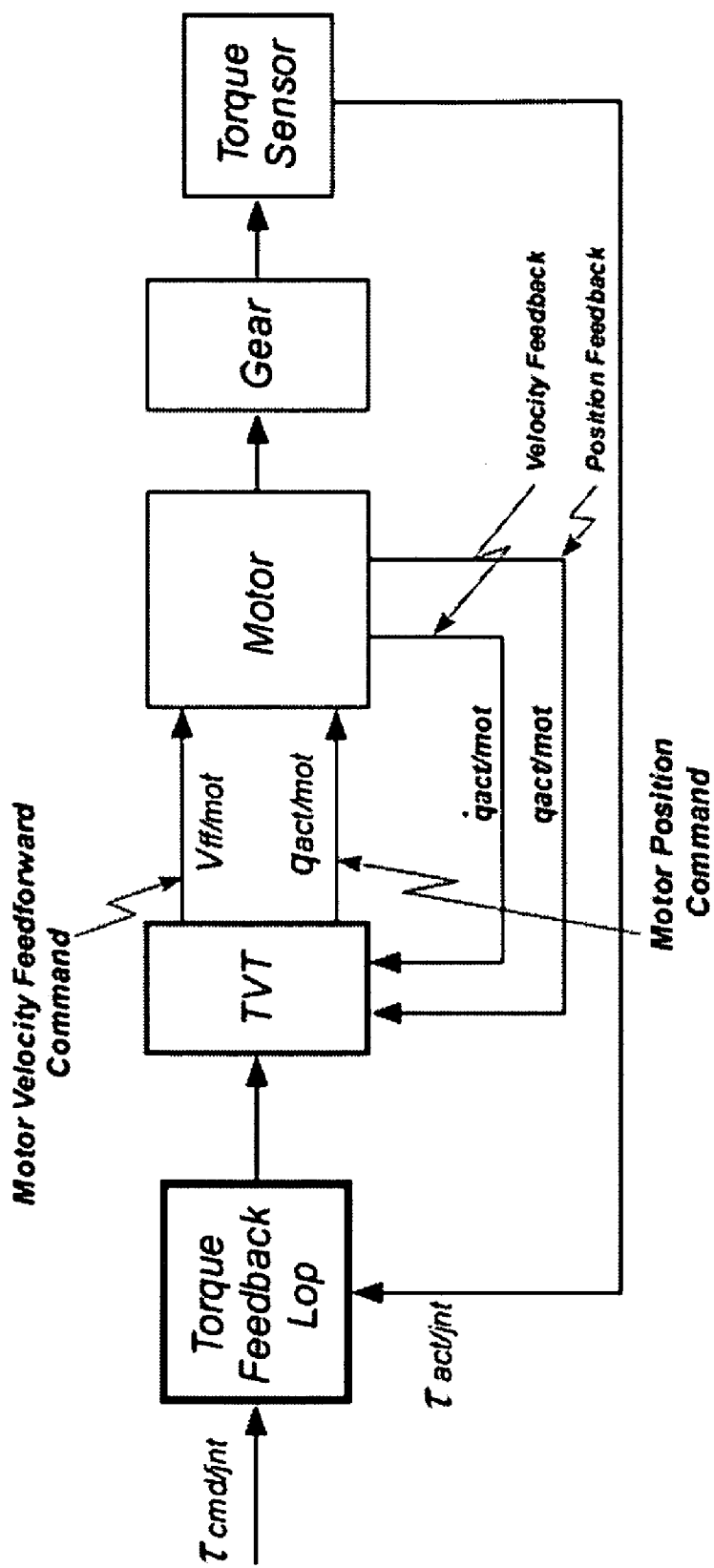
FIG. 14 is a block diagram illustrating torque feedback by a torque sensor, in one embodiment.

The hardware dependent characteristics such as friction, stiffness etc. can be cancelled by a torque sensor which is mounted on the output of a joint. By using information from the torque sensor, torque feedback control can be applied for a torque command to TVT. FIG. 14 is a block diagram illustrating torque feedback by a torque sensor, in one embodiment. The torque sensor makes it possible to close the open loop torque command and cancel the effect of the friction not accounted for by the TVT.

Figure 15:
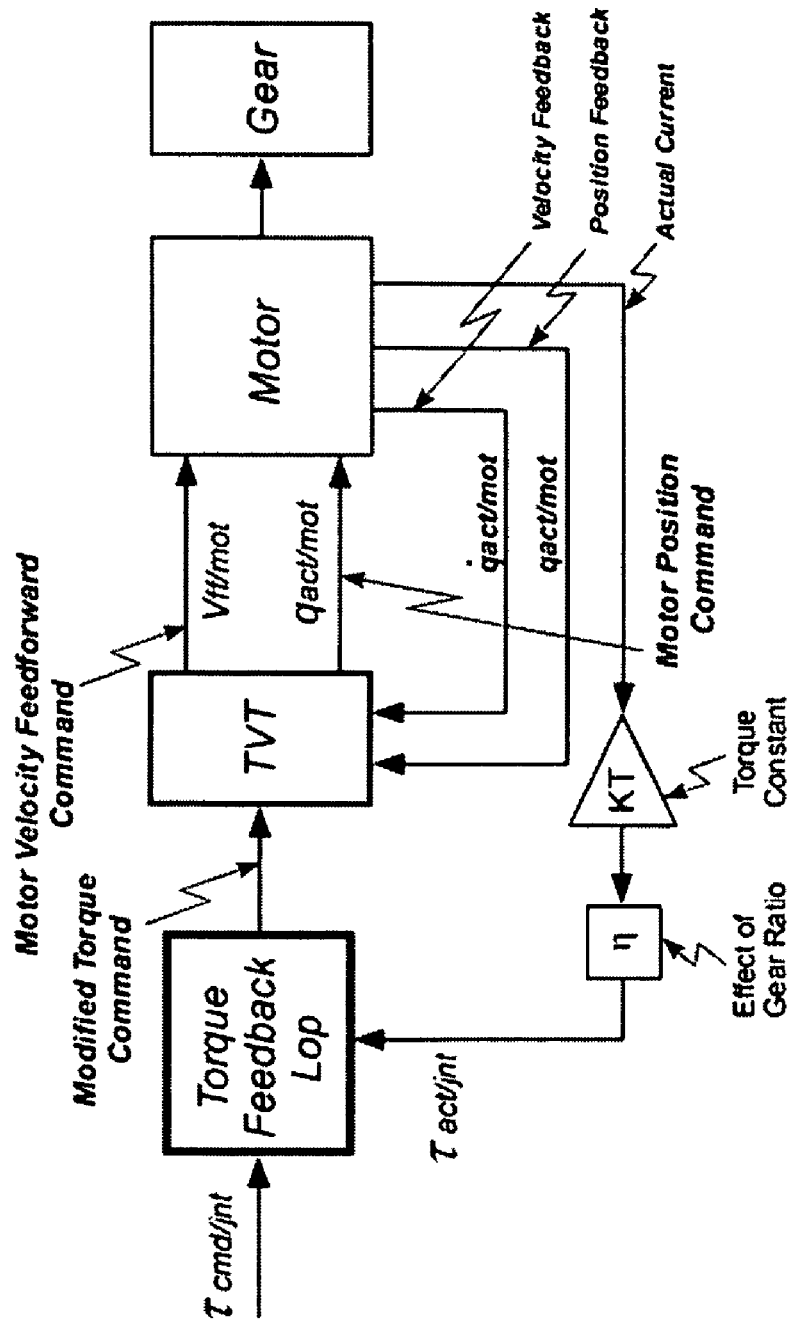
FIG. 15 is a block diagram illustrating the use of the actual motor current to calculate an actual joint torque for torque feedback, in one embodiment.

FIG. 15 is a block diagram illustrating the use of the actual motor current to calculate an actual joint torque for torque feedback, in one embodiment. This may be used if a torque sensor is not available and if the joint friction is small and does not affect the current of the motor. The motor current is multiplied by a torque constant and a gear ratio to calculate the actual torque.

Figure 16:
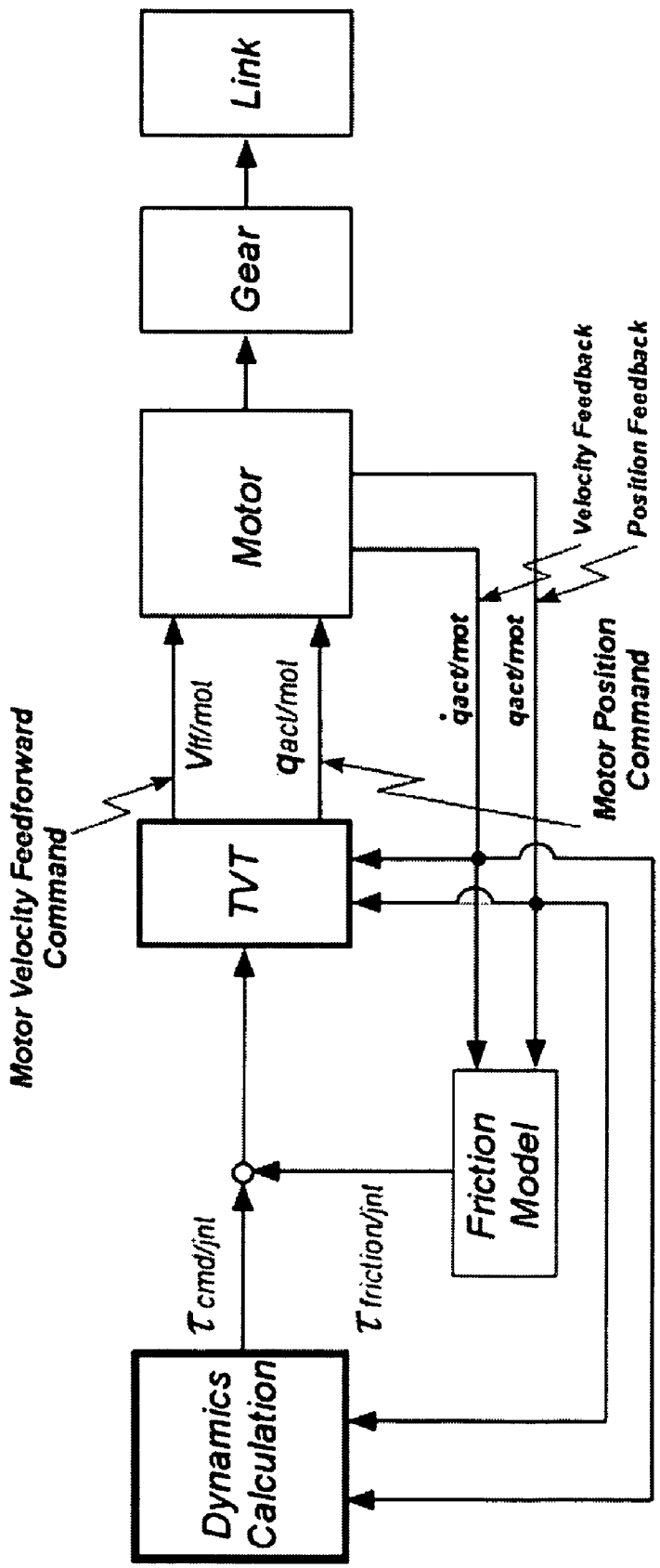
FIG. 16 is a block diagram illustrating joint torque feedback with dynamics calculation, in one embodiment.

To improve the motion of a robot, a torque command can be calculated through a dynamics calculation which accounts for mass, center of gravity, inertia, coriolis and centrifugal forces in joint space control and the end-effector's position control in task space control. As the robot moves, dynamics parameters are recalculated according to the posture of the robot and a correct torque command is generated for every servo loop time. FIG. 16 is a block diagram illustrating joint torque feedback with dynamics calculation, in one embodiment. Each joint torque command is calculated by the dynamics calculation element and is sent to every joint through the TVT.

Actual joint data such as a joint position and joint velocity is measured by a sensor and sent back to the dynamics calculation element.

Although the invention has been described in considerable detail with reference to certain embodiments thereof, other embodiments are possible as will be understood to those skilled in the art.

What is claimed is:

1. A method for controlling a joint of a robot, the joint having a position controller with a position feedback loop, the position controller having a velocity feedforward input configured to receive a desired velocity of the joint and a position input configured to receive a desired position of the joint, and the position controller configured to control motion of the joint to achieve the desired velocity and desired position, the method comprising:
   receiving, by a torque-to-velocity transformer, a torque command for the joint representing a desired torque of the joint;
   determining, a velocity feedforward command that when inputted to a velocity feedforward input of the position controller causes the position controller to control a physical joint of the robot to achieve the desired torque;
   sending the velocity feedforward command to the position controller; and
   sending a command to the position controller that cancels an effect of the position feedback loop.

2. The method of claim 1, wherein sending the command to the position controller that cancels the effect of the position feedback loop comprises:
   sending a position command to the position input of the position controller, the position command being an actual measured position of the joint.

3. The method of claim 1, wherein sending the command to the position controller that cancels the effect of the position feedback loop comprises:
   setting a gain of the position feedback loop to zero.

4. The method of claim 1, wherein determining the velocity feedforward command further comprises:
   determining a transfer function based on an observed frequency response of the position controller.

5. The method of claim 1, wherein the velocity feedforward command is based at least in part on a friction of the joint and an inertia of a gear and a link attached to the joint.

6. The method of claim 1, wherein the velocity feedforward command is equal to $$\frac{\tau_{cmd/jnt}}{KV \cdot KT \cdot CL \cdot \eta^2} + \dot{q}_{act/jnt},$$

where $\tau_{cmd/jnt}$ is the torque command for the joint, KV is a velocity gain of the position controller, KT is a torque constant of the position controller, CL is a gain of a current feedback loop of the position controller, $\dot{q}_{act/jnt}$ a measured velocity of the joint, and $\eta$ is a gear ratio of the joint.

7. The method of claim 1, wherein the velocity feedforward command is equal to $$\frac{\tau_{cmd/jnt}}{KV \cdot KT \cdot \eta^2} + \dot{q}_{act/jnt},$$

where $\tau_{cmd/jnt}$ is the torque command for the joint, KV is a velocity gain of the position controller, KT is a torque constant of the position controller, $\dot{q}_{act/jnt}$ is a measured velocity of the joint, and $\eta$ is a gear ratio of the joint.

8. The method of claim 1, wherein the joint is controlled using open-loop torque control.

9. The method of claim 1, further comprising:
   modifying the torque command based on a friction model to account for a friction of the joint.

10. The method of claim 1, further comprising:
    receiving a measured torque of the joint; and
    modifying the torque command based on the measured torque to account for a friction of the joint.

11. A torque-to-velocity transformer for controlling a joint of a robot, the joint having a position controller with a position feedback loop, the position controller having a velocity feedforward input configured to receive a desired velocity of the joint and a position input configured to receive a desired position of the joint, and the position controller configured to control motion of the joint to achieve the desired velocity and desired position, the torque-to-velocity transformer comprising:
   a receiving module for receiving a torque command for the joint representing a desired torque of the joint;
   a determining module for-determining a velocity feedforward command that when inputted to a velocity feedforward input of the position controller causes the position controller to control a physical joint of the robot to achieve the desired torque;
   a sending module for sending the velocity feedforward command to the position controller; and
   a canceling module for sending a command to the position controller that canceling cancels an effect of the position feedback loop.

12. The torque-to-velocity transformer of claim 11, wherein sending the command to the position controller that cancels the effect of the position feedback loop comprises:
   sending a position command to the position input of the position controller, the position command being an actual measured position of the joint.

13. The torque-to-velocity transformer of claim 11, wherein sending the command to the position controller that cancels the effect of the position feedback loop comprises:
   setting a gain of the position feedback loop to zero.

14. The torque-to-velocity transformer of claim 11, wherein determining the velocity feedforward command further comprises:
   determining a transfer function based on an observed frequency response of the position controller.

15. The torque-to-velocity transformer of claim 11, wherein the velocity feedforward command is based at least in part on a friction of the joint and an inertia of a gear and a link attached to the joint.

16. The torque-to-velocity transformer of claim 11, wherein the velocity feedforward command is equal to $$\frac{\tau_{cmd/jnt}}{KV \cdot KT \cdot CL \cdot \eta^2} + \dot{q}_{act/jnt},$$

where $\tau_{cmd/jnt}$ is the torque command for the joint, KV is a velocity gain of the position controller, KT is a torque constant of the position controller, CL is a gain of a current feedback loop of the position controller, $\dot{q}_{act/jnt}$ is a measured velocity of the joint, and $\eta$ is a gear ratio of the joint.

17. The torque-to-velocity transformer of claim 11, wherein the velocity feedforward command is equal to $$\frac{\tau_{cmd/jnt}}{KV \cdot KT \cdot \eta^2} + \dot{q}_{act/jnt},$$

where $\tau_{cmd/jnt}$ is the torque command for the joint, KV is a velocity gain of the position controller, KT is a torque constant of the position controller, $\dot{q}_{act/jnt}$ is a measured velocity of the joint, and $\eta$ is a gear ratio of the joint.

18. The torque-to-velocity transformer of claim 11, wherein the joint is controlled using open-loop torque control.

19. The torque-to-velocity transformer of claim 11, further comprising:
a modifying module for modifying the torque command based on a friction model to account for a friction of the joint.

20. The torque-to-velocity transformer of claim 11, further comprising:
a second receiving module for receiving a measured torque of the joint; and
a second modifying module for modifying the torque command based on the measured torque to account for a friction of the joint.

* * * * *

UNITED STATES PATENT AND TRADEMARK OFFICE
CERTIFICATE OF CORRECTION

PATENT NO. : 7,986,118 B2
APPLICATION NO. : 12/099047
DATED : July 26, 2011
INVENTOR(S) : Yoshikawa It is certified that error appears in the above-identified patent and that said Letters Patent is hereby corrected as shown below:

Column 11, line 21, after "determining," insert --by the torque-to-velocity transformer,--.

Column 11, line 57, after "controller, $\dot{q}_{act/jnt}$" insert --is--

Signed and Sealed this
Twenty-seventh Day of September, 2011

David J. Kappos
*Director of the United States Patent and Trademark Office*